(12) United States Patent
Bai et al.

(10) Patent No.: US 12,340,738 B2
(45) Date of Patent: Jun. 24, 2025

(54) DISPLAY METHOD FOR DISPLAY PANEL, AND ELECTRONIC DEVICE

(71) Applicant: Honor Device Co., Ltd., Shenzhen (CN)

(72) Inventors: Jian Bai, Shenzhen (CN); Jiehua Tang, Shenzhen (CN); Peng Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/572,070

(22) PCT Filed: Sep. 7, 2023

(86) PCT No.: PCT/CN2023/117451
§ 371 (c)(1),
(2) Date: Dec. 19, 2023

(87) PCT Pub. No.: WO2024/131145
PCT Pub. Date: Jun. 27, 2024

(65) Prior Publication Data
US 2025/0095562 A1 Mar. 20, 2025

(30) Foreign Application Priority Data
Dec. 20, 2022 (CN) .......................... 202211638294.1

(51) Int. Cl.
*G09G 3/3208* (2016.01)
(52) U.S. Cl.
CPC ... *G09G 3/3208* (2013.01); *G09G 2320/0233* (2013.01); *G09G 2320/0271* (2013.01)

(58) Field of Classification Search
None
See application file for complete search history.

(56) References Cited

U.S. PATENT DOCUMENTS

| 7,733,314 B2 | 6/2010 | Cho |
| 8,767,001 B2 | 7/2014 | Choi et al. |

(Continued)

FOREIGN PATENT DOCUMENTS

| CN | 101025900 A | 8/2007 |
| CN | 109256101 A | 1/2019 |

(Continued)

*Primary Examiner* — Nicholas J Lee
(74) *Attorney, Agent, or Firm* — Conley Rose, P.C.

(57) ABSTRACT

A display method for a display panel, and an electronic device. The electronic device stores at least two compensation gray level relationships, a first compensation gray level relationship matches a first gray level range, a second compensation gray level relationship matches a second gray level range, the first compensation gray level relationship is fitted and generated based on an N-nomial algorithm, and the second compensation gray level relationship is obtained in a linear interpolation manner. A gray level value within the first gray level range is greater than a gray level value within the second gray level range. The method includes: obtaining a gray level value of each pixel of an input image; performing gray level compensation on the input image based on the gray level value of each pixel and the at least two compensation gray level relationships; and displaying a compensated image.

20 Claims, 5 Drawing Sheets

(56) References Cited

U.S. PATENT DOCUMENTS

| | | | |
|---|---|---|---|
| 11,367,405 B2 | 6/2022 | Gao | |
| 2020/0126499 A1* | 4/2020 | Huang | G09G 3/3607 |
| 2022/0343827 A1* | 10/2022 | Zhan | G09G 3/2074 |
| 2023/0069956 A1* | 3/2023 | Chen | G09G 3/2092 |

FOREIGN PATENT DOCUMENTS

| | | |
|---|---|---|
| CN | 110390653 A | 10/2019 |
| CN | 111028809 A | 4/2020 |
| CN | 111816112 A | 10/2020 |
| CN | 112562576 A | 3/2021 |
| CN | 113257166 A | 8/2021 |
| CN | 114446217 A | 5/2022 |
| CN | 115620668 A | 1/2023 |
| JP | 2019095559 A | 6/2019 |
| KR | 20050089433 A | 9/2005 |
| KR | 20120054959 A | 5/2012 |

\* cited by examiner 6a          6b

DISPLAY METHOD FOR DISPLAY PANEL, AND ELECTRONIC DEVICE

CROSS-REFERENCE TO RELATED APPLICATIONS

This is a U.S. National Stage of International Application No. PCT/CN2023/117451 filed on Sep. 7, 2023, which claims priority to Chinese Patent Application No. 202211638294.1, filed with the China National Intellectual Property Administration on Dec. 20, 2022, both of which are incorporated herein by reference in their entireties.

TECHNICAL FIELD

This application relates to the field of display technologies, and in particular, to a display method for a display panel, and an electronic device.

BACKGROUND

An OLED (OrganicLight-Emitting Diode, organic light-emitting diode) display panel has advantages of excellent color saturation, contrast, and response speed due to self-emitting display without backlight and a liquid crystal, thereby having a broad application prospect. A TFT (Thin Film Transistor, thin film transistor) is generally required to be disposed in the OLED display panel. Due to instability of a compound in the TFT and instability of a light-emitting material process and a manufacturing process, a brightness mura problem occurs in the OLED display panel.

A display mura problem in the OLED display panel is generally eliminated through a method of Demura (mura elimination), where the Demura generally includes electrical compensation and optical compensation. Due to complexity of the electrical compensation, an optical compensation manner is generally used. However, a current optical compensation manner is inaccurate. As a result, the mura problem in the OLED display panel cannot be well eliminated.

SUMMARY

To resolve the foregoing technical problem, this application provides a display method for a display panel, and an electronic device, so that the electronic device can perform, based on a gray level range that each pixel is within, gray level compensation on the pixel, to reduce or eliminate a display mura problem that occurs in an image displayed on the display panel.

According to a first aspect, this application provides a display method for a display panel, applied to an electronic device including the display panel. The electronic device stores at least two compensation gray level relationships, a first compensation gray level relationship matches a first gray level range, a second compensation gray level relationship matches a second gray level range, the first compensation gray level relationship is fitted and generated based on an N-nomial algorithm, N is an integer greater than 1, and the second compensation gray level relationship is obtained in a linear interpolation manner. A gray level value within the first gray level range is greater than a gray level value within the second gray level range. The method includes: obtaining a gray level value of each pixel of an input image: performing gray level compensation on the input image based on the gray level value of each pixel and the at least two compensation gray level relationships; and displaying a compensated image on the display panel.

In this way, when the display panel is within a high gray level range (for example, 32-255), as a gray level continuously increases, a type of mura occurring on the display panel is more unitary. Therefore, in this case, performing gray level compensation on an image by using a first compensation gray level relationship obtained through polynomial can better eliminate a display mura problem. The gray level value within the second gray level range is less than the gray level value within the first gray level range. As a gray level value decreases, the type of mura occurring on the display panel increases, and a mura phenomenon is more serious. In addition, if a polynomial curve is used for a low-gray level image, a compensated gray level value may be inaccurate. The second compensation gray level relationship is determined in the linear interpolation manner, so that compensation may be more accurately performed on the gray level value by using the second compensation gray level relationship. In this example, the electronic device stores the at least two gray level ranges, and the compensation gray level relationships matching the at least two gray level ranges. Gray level compensation may be performed on each pixel by using a compensation gray level relationship corresponding to a gray level of the pixel, so that gray level compensation of each pixel is accurate, and the mura problem of the display panel can be better eliminated. In addition, a same compensation gray level relationship is not used for a full gray level, so that decoupling between the second compensation gray level relationship for the first gray level range and the first compensation gray level relationship for the second gray level range can be implemented.

According to the first aspect, the method further includes: obtaining at least three first gray level values of a sampled image displayed on the display panel, where the first gray level value is within the first gray level range: obtaining first compensated gray level values for the at least three first gray level values; and fitting and generating an N-nomial curve as the first compensation gray level relationship based on the at least three first gray level values, the first compensated gray level values corresponding to the first gray level values, and the N-nomial algorithm. In this way, at least three first gray level values and corresponding first compensated gray level values are required for a two-nomial curve. By obtaining the N-nomial curve through fitting, a compensation gray level within the first gray level range is close to or falls on the N-nomial curve, so that gray level compensation can be accurately performed on a displayed image within the first gray level range by using the N-nomial curve.

According to the first aspect, the method further includes: acquiring at least two second gray level values of a sampled image displayed on the display panel, where the second gray level value is within the second gray level range: obtaining second compensated gray level values respectively corresponding to the at least two second gray level values: determining at least one linear straight line in the linear interpolation manner based on the at least two second gray level values and the second compensated gray level values respectively corresponding to the at least two second gray level values; and using the determined at least one linear straight line as the second compensation gray level relationship. In this way, when the display panel displays a low-gray level (for example, 0-31) image, as a gray level decreases, a mura problem is more serious and a mura phenomenon is irregular. Therefore, at least one (for example, more than two) linear straight line may be obtained in the linear interpolation manner by using the at least two second gray level values and the respectively corresponding second compensated gray levels, and the second compensation gray level relationship is formed by a plurality of linear straight lines, so that the irregular mura phenomenon can be eliminated.

According to the first aspect, the electronic device further stores a third compensation gray level relationship, the third compensation gray level relationship matches a third gray level range, the third compensation gray level relationship is fitted and generated based on a gray level value within the second gray level range and an M-nomial algorithm, M is an integer greater than 1, and each gray level value within the second gray level range is greater than a gray level value within the third gray level range. In this way, the full gray level is divided into three gray level ranges. The gray level value within the third gray level range is less than the gray level value within the second gray level range. Because a minimum gray level (for example, gray levels of 0-7) is not prone to be acquired by a camera, predicting the third compensation gray level relationship by using a plurality of second gray level values can take into account a trend of the minimum gray level and avoid a sudden jump problem occurring at a gray level.

According to the first aspect, the method further includes: acquiring at least three second gray level values of a sampled image displayed on the display panel, where the second gray level value is within the second gray level range: obtaining second compensated gray level values for the at least three second gray level values; and fitting and generating an M-nomial curve as the third compensation gray level relationship based on the at least three second gray level values, the second compensated gray level values corresponding to the second gray level values, and the M-nomial algorithm. In this way, a polynomial fitting manner is used, so that gray level compensation can be accurately performed on a displayed image within the third gray level range by using the M-nomial curve.

According to the first aspect, the performing gray level compensation on the input image based on the gray level value of each pixel and the at least two compensation gray level relationships includes: performing the following compensation processing for the gray level value of each pixel: determining, based on the gray level value of the pixel and the at least two gray level ranges, a gray level range that the gray level value is within: determining a compensated gray level value of the gray level value based on the first compensation gray level relationship when detecting that the gray level value is within the first gray level range: determining a compensated gray level value of the gray level value based on the second compensation gray level relationship when detecting that the gray level value is within the second gray level range: determining a compensated gray level value of the gray level value based on the third compensation gray level relationship when detecting that the gray level value is within the third gray level range; and performing compensation on the gray level value of the pixel based on the determined compensated gray level value. In this way, the electronic device selects, based on the gray level range that the gray level value of the pixel is within, the matching compensation gray level relationship to perform compensation on the pixel, so that there is no display mura problem on the compensated image displayed on the display panel, and accuracy of eliminating display mura of the display panel is improved.

According to the first aspect, the first gray level range includes: 32-255; and the second gray level range includes: 0-31. In this way, when the display panel displays an image below a gray level 32, various mura problems apparently occur. Therefore, performing gray level range division based on the gray level 32 is more consistent with a display situation.

According to the first aspect, the first gray level range includes: 32-255: the second gray level range includes: 8-31; and the third gray level range includes: 0-7. In this way, when a display elevation panel displays an image below a gray level 32, various mura problems apparently occur, and it is difficult for the camera to acquire an image below a gray level 8. Therefore, gray level range division is performed based on the gray level 32 and a gray level 7, so that images in different gray levels can be better compensated subsequently.

According to the first aspect, the obtaining second compensated gray level values respectively corresponding to the at least two second gray level values includes: querying the second compensated gray level values corresponding to the at least two second gray level values based on a preset lookup table LUT. In this way, the second compensated gray level value corresponding to the second gray level value can be quickly and accurately obtained by using the LUT.

According to a second aspect, this application provides an electronic device, including: a memory and a processor. The memory is coupled to the processor; and the memory stores program instructions, and the program instructions, when executed by the processor, cause the electronic device to perform the display method for the display panel corresponding to any one of the implementations in the first aspect and the electronic device.

The second aspect and any one of the implementations in the second aspect correspond to the first aspect and any one of the implementations in the first aspect respectively. Details are not described herein again.

According to a third aspect, this application provides a computer-readable medium, configured to store a computer program. The computer program, when run on an electronic device, causes the electronic device to perform the display method for the display panel corresponding to any one of the implementations in the first aspect.

BRIEF DESCRIPTION OF DRAWINGS

To describe technical solutions in embodiments of this application more clearly, the following briefly describes accompanying drawings required for describing the embodiments of this application. Apparently, the accompanying drawings in the following description show merely some embodiments of this application, and a person of ordinary skill in the art may still derive other drawings from these accompanying drawings without creative efforts.

DESCRIPTION OF EMBODIMENTS

Figure 1:
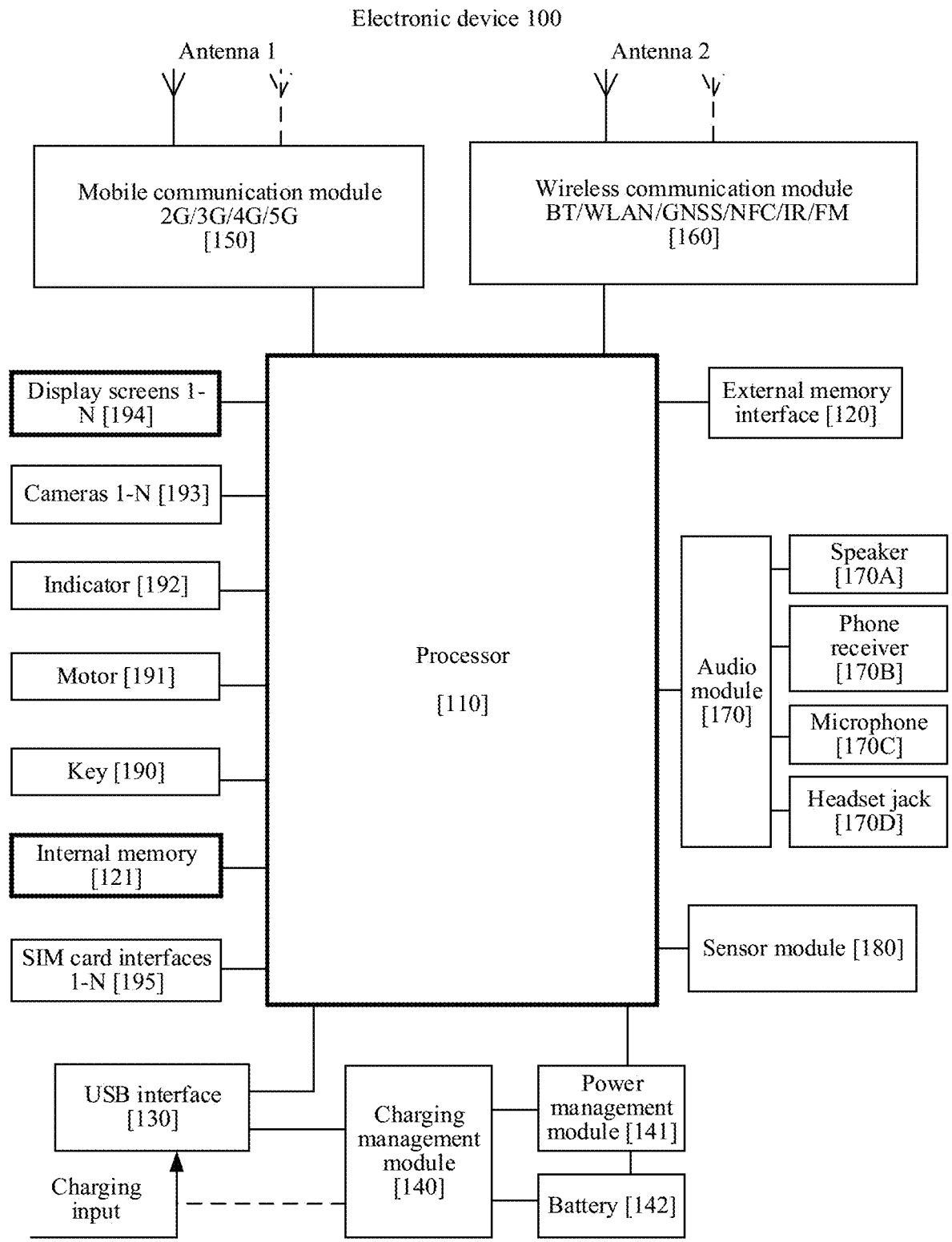
FIG. 1 is an exemplarily shown schematic diagram of an electronic device.

The following clearly and completely describes the technical solutions in the embodiments of this application with reference to the accompanying drawings in the embodiments of this application. Apparently, the described embodiments are merely some rather than all embodiments of this application. All other embodiments obtained by a person of ordinary skill in the art based on the embodiments of this application without creative efforts shall fall within the protection scope of this application.

In some embodiments, due to instability of a compound in a TFT in an OLED display panel and instability of a light-emitting material process and a manufacturing process, a brightness mura problem occurs in the OLED display panel. The brightness mura problem is also referred to as a mura problem. Generally, a method for eliminating display mura of a display panel is referred to as Demura (mura elimination). A process of mura elimination may include the following steps.

Step 1: A camera acquires brightness data of a sampled image displayed on the OLED display panel. The sampled image may be a gray level picture, or may be a color picture. In this example, description is made by using an example in which the sampled image is a gray level surface. For the camera, a CMOS (Complementary Metal Oxide Semiconductor, complementary metal oxide semiconductor) or CCD (charge coupled device, "charge coupled device") camera may be used. The camera for acquisition features high resolution and low noise, to improve accuracy of Demura.

The camera may acquire a plurality of images in different gray levels, for example, acquire an image in 32 gray levels, an image in 127 gray levels, and an image in 225 gray levels. A process of eliminating the display mura is to perform processing for each pixel. Optionally, a gray level value, recorded as X1, of a same pixel point (for example, a pixel A) in the 32 gray levels, a gray level value, recorded as X2, of the pixel point in the 127 gray levels, and a gray level value, recorded as X3, of the pixel point in 227 gray levels may be acquired.

Step 2: Calculate a compensated gray level value for a gray level value of a sampled point.

Specifically, compensated gray level values for the three gray level values may be calculated by a computing device based on a gray level compensation formula. For example, the computing device calculates and obtains that a compensated gray level value for X1 is Y1, a compensated gray level value for X2 is Y2, and a compensated gray level value for X3 is Y3. An existing algorithm may be used for the gray level compensation formula, and details are not described herein again. The computing device may be a device mounted with the display panel, or may be the display panel.

Step 3: The computing device fits a compensation gray level curve based on the acquired gray level values and the corresponding compensated gray level values.

Specifically, the computing device uses a gray level value and a corresponding compensated gray level value as one piece of two-dimensional data. For example, the three gray level values of the pixel point Pixel A and the respectively corresponding compensated gray level values form three pieces of two-dimensional data, which are respectively recorded as (X1, Y1), (X2, Y2), and (X3, Y3). The computing device may fit the compensation gray level curve by using a least squares method based on the three pieces of two-dimensional data. The compensation gray level curve indicates a correspondence between the gray level value and the corresponding compensated gray level value. For example, the fitted compensation gray level curve is a quadratic equation curve, which is recorded as $Y=aX^2+bX+c$, where a and b are coefficients of the quadratic equation curve, c is a constant term, Y expresses the compensated gray level value, and X expresses the gray level value.

A driver chip (namely, a Driver IC) of the display panel may store the compensation gray level curve. When a mura elimination (Demura) function is started, the driver chip may perform compensation on a gray level value of each pixel based on the compensation gray level curve, obtain a compensated image, and display the compensated image on the display panel.

In Demura, a gray level curve may be fitted by using a plurality of acquired gray level values. For accuracy of fitting, the acquired gray level values may be evenly distributed within a gray level range of 0-255. However, a compensated gray level value of a low-gray level image may not be on the fitted compensation gray level curve. An actual compensated gray level value for a low gray level value is greatly different from a compensated gray level value corresponding to the low gray level value on the compensation gray level curve, and the actual compensated gray level value may be calculated and obtained by using a gray level compensation algorithm. A low gray level may be a gray level value within 0-32. If photographing is performed and a curve is fitted by using an image within gray levels 0-32, a compensated gray level value corresponding to a gray level value within a high gray level range (for example, 33-255) may not be on a fitted compensation gray level curve. As a result, compensation cannot be accurately performed on each gray level value by using the fitted compensation gray level curve, resulting in a poor effect of eliminating mura of the display panel.

An embodiment of this application provides a display method for a display panel, and the display method is applied to an electronic device provided with the display panel. The electronic device is, for example, a mobile phone, a television, a tablet computer, a bracelet, or a smart watch. The electronic device may prestore at least two different compensation gray level relationships, and the compensation gray level relationship indicates a correspondence between a gray level value and a compensated gray level value. The at least two compensation gray level relationships are a first compensation gray level relationship and a second compensation gray level relationship respectively, the first compensation gray level relationship matches a first gray level range, and the second compensation gray level relationship matches a second gray level range. A gray level value within the first gray level range is greater than a gray level value within the second gray level range. That is to say; there is a compensation gray level relationship matching each gray level range. After obtaining a to-be-displayed image, a display chip of the display panel may perform compensation on a gray level value of each pixel point of the to-be-displayed image, the stored at least two compensation gray level relationships, and a gray level value of each pixel, to obtain a compensated to-be-displayed image. The display chip controls the compensated to-be-displayed image to be displayed on the display panel.

Because a gray level range of 0-255 is divided into at least two gray level ranges, and there is a compensation gray level relationship (namely, a compensation gray level curve) corresponding to each gray level range, for gray level values within different gray level ranges, compensation may be performed on the gray level values by using respectively corresponding compensation gray level relationships, to avoid an excessive difference between an actual compensated gray level value for a low gray level and a compensation gray level curve, which improves accuracy of gray level compensation and better eliminates a display mura problem of the display panel.

FIG. 1 is a schematic diagram of a structure of an electronic device 100 according to an embodiment of this application. The electronic device may be a television, a computer, a mobile phone, a watch, a bracelet, a tablet computer, an in-vehicle device, or the like. It should be understood that the electronic device 100 shown in FIG. 1 is only an example of the electronic device, and the electronic device 100 may have more or fewer components than those shown in the figure, may combine two or more components, or may have a different component configuration. The components shown in FIG. 1 may be implemented by hardware that includes one or more signal processors and/or application-specific integrated circuits, software, or a combination of hardware and software.

The electronic device 100 may include: a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (subscriber identification module, SIM) card interface 195, and the like. The sensor module 180 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

Figure 2:
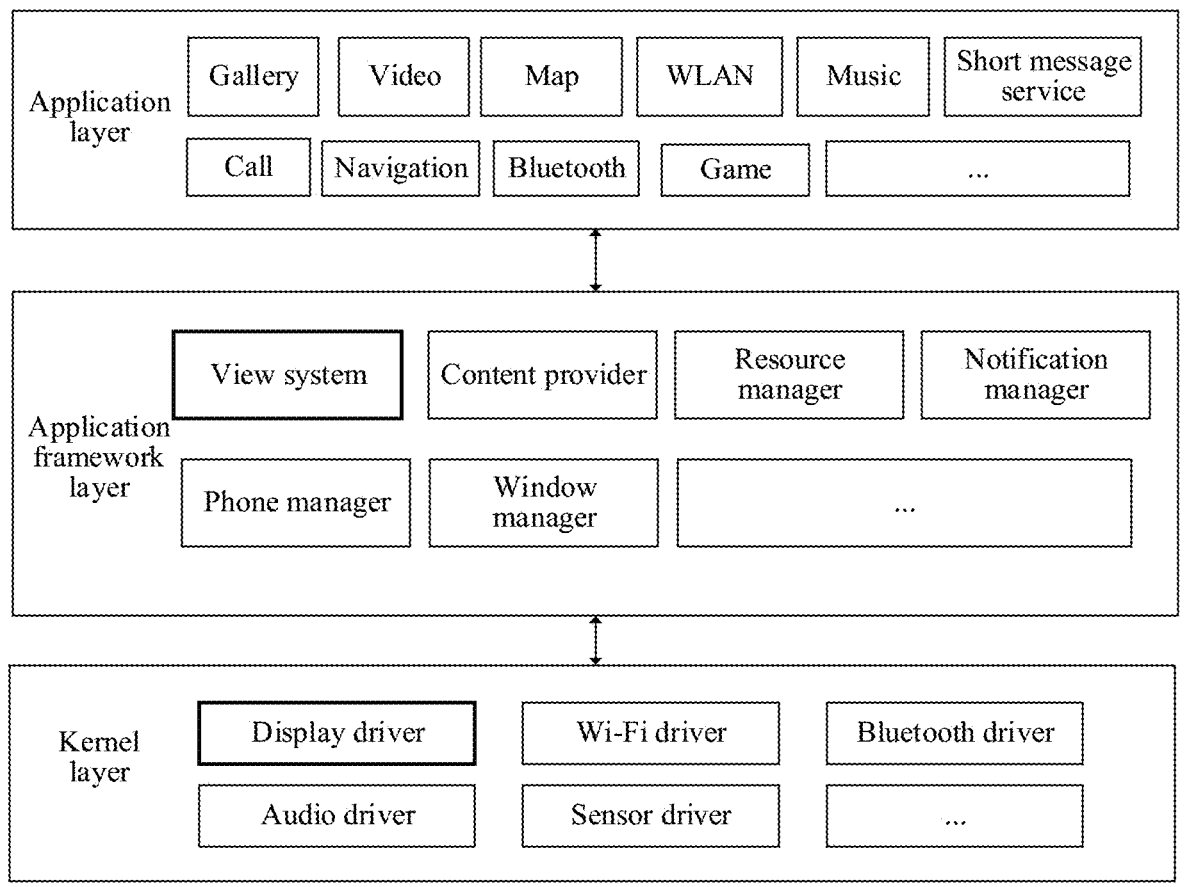
FIG. 2 is an exemplarily shown schematic diagram of a software structure of an electronic device.

FIG. 2 is a block diagram of a software structure of an electronic device 100 according to an embodiment of this application.

In a layered architecture of the electronic device 100, software is divided into several layers, and each layer has a clear role and task. The layers communicate with each other through a software interface. In some embodiments, an Android system is divided into three layers, namely, an application layer, an application framework layer, and a kernel layer from top to bottom.

The application layer may include a series of application packages.

As shown in FIG. 2, the application packages may include applications such as Gallery, Video, Music, Map, WLAN, Music, Short message service, Call, Navigation, Bluetooth, and Game. Gray level compensation may be performed on a display interface in each application before the display interface is displayed, to avoid that a mura problem occurs in a displayed picture.

The application framework layer provides an application programming interface (application programming interface, API) and a programming framework for the applications at the application layer. The application framework layer includes some predefined functions.

As shown in FIG. 2, the application framework layer may include a window manager, a content provider, a view system, a phone manager, a resource manager, a notification manager, and the like.

The view system includes visual controls such as a control for displaying a text and a control for display an image. The view system may be configured to construct an application. A display interface may include one or more views. For example, a display interface including a short message service notification icon may include a view for displaying a text and a view for displaying a picture.

The window manager is configured to manage a window program. The window manager may obtain a size of a display screen, determine whether there is a status bar, lock a screen, capture a screen, and the like.

The content provider is configured to store and obtain data and make the data accessible to an application program. The data may include a video, an image, an audio, calls that are made and received, a browsing history and a bookmark, an address book, and the like.

The phone manager is configured to provide a communication function for the electronic device 100, for example, call status management (including answering, declining, or the like).

The resource manager provides various resources such as a localized character string, an icon, a picture, a layout file, and a video file for an application.

The notification manager enables an application to display notification information on a status bar that may be configured to convey a message of a notification type, where the message may disappear automatically after a short stay without user interaction. For example, the notification manager is configured to provide a notification of download completion, a message prompt, and the like. The notification manager may alternatively be a notification that appears on a top status bar of the system in a form of a graph or a scroll bar text, for example, a notification of an application running on the background, or may be a notification that appears on the screen in a form of a dialog window. For example, text information is prompted on the status bar, a prompt tone is made, the electronic device vibrates, or an indicator light flashes.

The kernel layer is a layer between hardware and software. The kernel layer includes a kernel scheduling module. The kernel scheduling module may modify a priority of a thread: or may prioritize scheduling a resource for a second thread within preset duration according to an indication of a first thread. The kernel layer may further include various drivers, for example, the kernel layer includes a display driver, a camera driver, an audio driver, and a sensor driver. In the display driver, each compensation gray level relationship may be obtained from a flash, to compensate a gray level of each pixel. The display driver may transmit a compensated image to a display layer for display.

It may be understood that the layers in the software structure shown in FIG. 2 and the component included in each layer do not constitute a specific limitation on the electronic device 100. In some other embodiments of this application, the electronic device 100 may include more or fewer layers than those shown in the figure, and each layer may include more or fewer components. This is not limited in this application.

Figure 3:
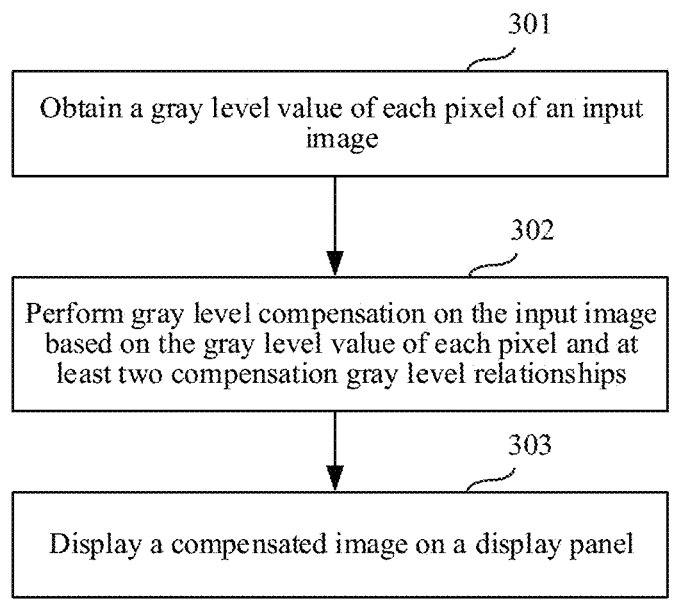
FIG. 3 is an exemplarily shown flowchart of a display method for a display panel.

FIG. 3 is an exemplarily shown flowchart of a display method for a display panel. As shown in FIG. 3, the display method includes the following procedure.

Step 301: An electronic device obtains a gray level value of each pixel of an input image.

For example, the electronic device is a smart phone in this example, the smart phone is provided with a display panel, and the display panel may be an OLED display panel. The display panel is provided with a corresponding driver chip, and the driver chip may be configured to control image display on the display panel. The display panel is further provided with a memory, for example, a flash (flash), compressed data of a to-be-displayed image may be stored in the flash, and the driver chip may extract data from the flash when a Demura function is started. The input image is formed by a plurality of pixels, and the electronic device may obtain the gray level value of each pixel.

Figure 4:
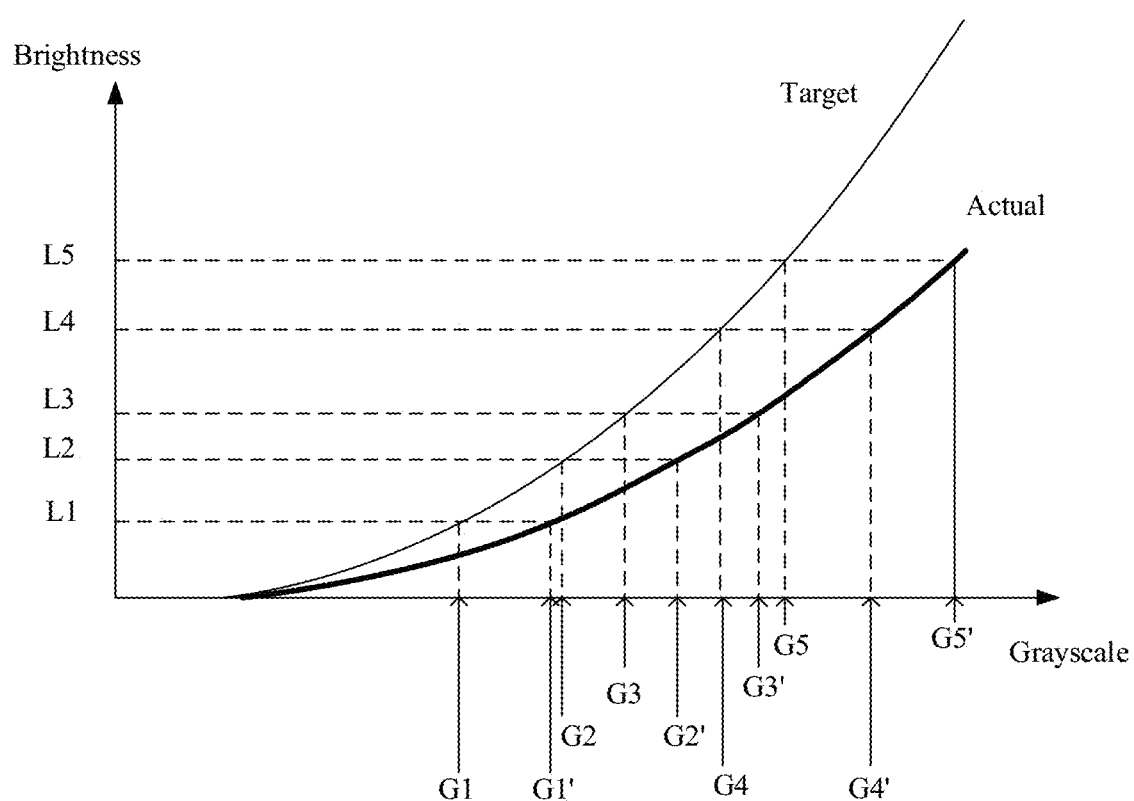
FIG. 4 is an exemplarily shown schematic diagram of a correspondence between brightness and a gray level.

FIG. 4 is an exemplarily shown schematic diagram of a correspondence between brightness and a gray level. As shown in FIG. 4, an abscissa indicates a gray level value, and an ordinate indicates a brightness value. When a brightness value is L1, a target gray level value corresponding to the brightness value L1 is G1. A target gray level value indicates a gray level value corresponding to a brightness value when a display panel is not affected by another factor, or may be understood as a standard gray level value corresponding to the brightness value. Because the OLED display panel is affected by an environment, a manufacturing process, and a material, a gray level value actually corresponding to L1 is G1'. Likewise, for a brightness value being L2, a target gray level value is G2 and an actual gray level value is G2': for a brightness value being L3, a target gray level value is G3 and an actual gray level value is G3': for a brightness value being L4, a target gray level value is G4 and an actual gray level value is G4'; and for a brightness value being L5, a target gray level value is G5 and an actual gray level value is G5'. It may be learned from FIG. 4 that there is a difference between a target gray level value of each pixel and an actual gray level value of the pixel, so that the actual gray level value of the pixel needs to be compensated, so that a compensated actual gray level value may be infinitely close to or equal to the target gray level value.

In this example, that the electronic device obtains the gray level value of each pixel is that the electronic device obtains an actual gray level value of each pixel. If the electronic device displays a color image, the gray level value of each pixel may be obtained through calculation.

Step 302: The electronic device performs gray level compensation on the input image based on the gray level value of each pixel and at least three compensation gray level relationships.

For example, the electronic device may divide a full gray level range into at least two gray level ranges in advance, for example, divide the full gray level range (namely, 0-255) into two gray level ranges, where a first gray level range is 32-255, and a second gray level range is 0-31. There is a compensation gray level relationship matching each gray level range, for example, the first gray level range matches a first compensation gray level relationship, and the second gray level range matches a second compensation gray level relationship.

The electronic device may pre-determine the compensation gray level relationship matching each gray level range, and store each gray level range and the compensation gray level relationship matching each gray level range. The following describes in detail a process of determining the compensation gray level relationship matching each gray level range.

The first gray level range includes 32-255, a gray level value within this gray level range includes a highest gray level value, and the first compensation gray level relationship may be obtained through fitting by using a polynomial algorithm. For example, a camera may perform photographing on a sampled image on the display panel of the electronic device. For the camera, a CMOS/CCD camera with high resolution may be used, and the sampled image may be a color image or a gray level image. The electronic device may extract a gray level value of each pixel in the sampled image.

When the sampled image is a color image, a gray level value corresponding to brightness of each pixel in the color image may be determined, to determine the gray level value of each pixel. When the sampled image is a gray level image, the gray level value of each pixel may be directly obtained.

The electronic device may obtain at least three first gray level values on the sampled image and corresponding first compensated gray level values. Specifically, a compensation gray level relationship for the first gray level range may be an N-order polynomial curve, and N is an integer greater than 1. For example, the compensation gray level relationship may be a two-order polynomial, a three-order polynomial, a four-order polynomial, or the like. If a first compensation gray level is an N-order polynomial, at least N+1 first gray level values are required to be acquired, and the first gray level value is a gray level value within the first gray level range. For example, if the first compensation gray level relationship is a two-order polynomial, at least three first gray level values are required to be acquired; and if a three-order polynomial is used for the first compensation gray level relationship, at least four first gray level values are required to be acquired. In this example, an example in which three first gray level values are acquired is used.

It is to be noted that, the electronic device may obtain three first gray level values of a same pixel point on the sampled image as three first gray level values on the sampled image.

Optionally, the electronic device may alternatively obtain three pixel points with different gray level values on the sampled image, and the gray level values of the three pixel points are all within the first gray level range. In this case, the gray level values of the three pixel points are used as three first gray level values on the sampled image.

The electronic device may determine the first compensated gray level value of the first gray level value based on the first gray level value. The electronic device may calculate first compensated gray level values respectively corresponding to the three first gray level values by using an existing algorithm. The electronic device may fit a two-order polynomial curve based on a least squares method based on the three first gray level values and the first compensated gray level values corresponding to the three first gray level values.

For example, the camera may capture an image 1 of the sampled image in 32 gray levels, an image 2 in 127 gray levels, and an image 3 in 225 gray levels. The electronic device may obtain a first gray level value, recorded as G4, of a pixel point A in the 32 gray levels from the image 1, obtain a first gray level value, recorded as G5, of the same pixel point A in the 127 gray levels from the image 2, and obtain a first gray level value, recorded as G6, of the same pixel point A in the 225 gray levels from the image 3. The electronic device determines a first compensated gray level value G4' for G4, a first compensated gray level value G5' for G5, and a first compensated gray level value G6' for G6 through calculation. G4 and G4' are used as one piece of two-dimensional data, G5 and G5' are used as one piece of two-dimensional data, and G6 and G6' are used as one piece of two-dimensional data; and the two-order polynomial curve may be fit based on the least squares method.

Figure 5:
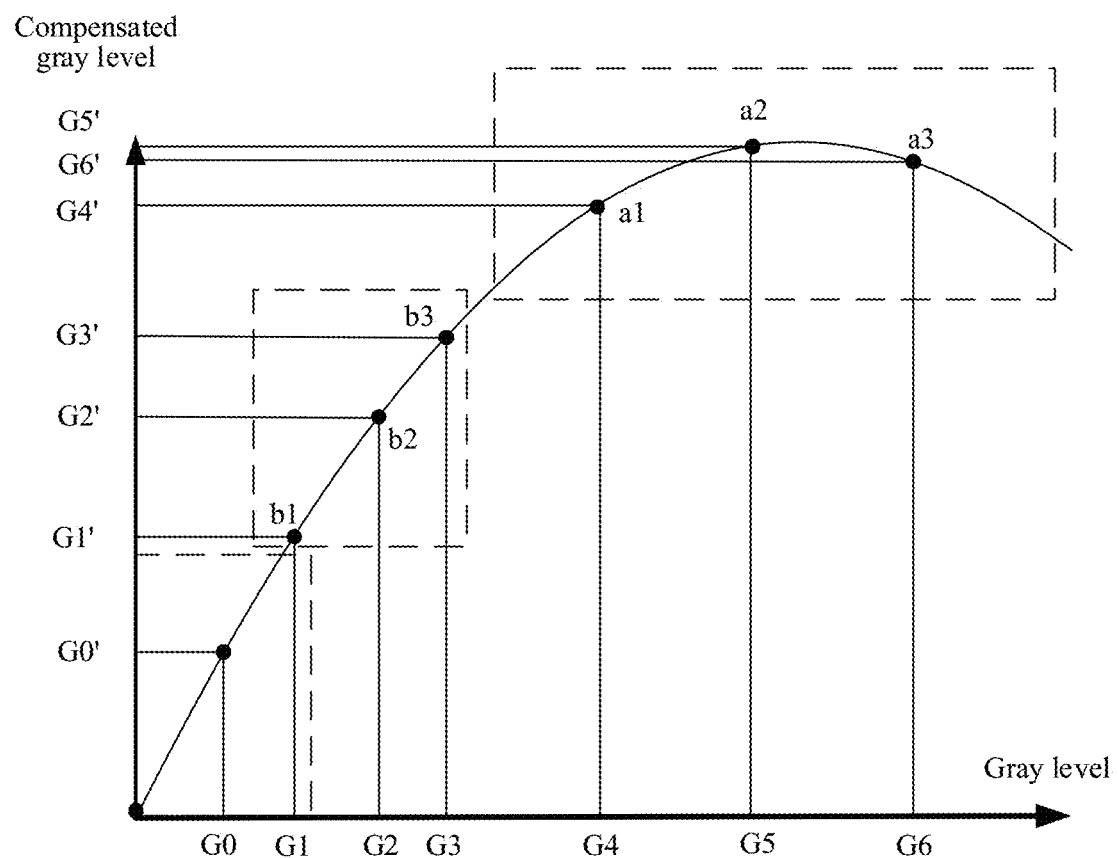
FIG. 5 is an exemplarily shown schematic diagram of a correspondence between a gray level and a compensation gray level.

For ease of understanding, reference may be made to FIG. 5. An abscissa of a coordinate system in FIG. 5 indicates a gray level, and an ordinate indicates a compensation gray level. In the coordinate system, coordinates of a1 are (G4, G4'), coordinates of a2 are (G5, G5'), and coordinates of a3 are (G6, G6'). Fitting is performed on a1, a2, and a3 based on the least squares method, to obtain $Y=aX^2+bX+c$, where a and b are coefficients of the quadratic equation, c is a constant term of the quadratic equation, Y expresses a compensated gray level value, and X expresses a gray level value. The curve $Y=aX^2+bX+c$, as the first compensation gray level relationship, is stored in the electronic device.

In an embodiment, the second gray level range is 0-31, a compensation gray level for a gray level value within the gray level range is generally not on a curve indicated by the first compensation gray level relationship. Performing compensation on a pixel point within the second gray level range by using the first compensation gray level relationship is difficult for eliminating display mura on the display panel. In this example, the second compensation gray level relationship for the second gray level range may be determined in a linear interpolation manner.

For example, a camera may perform photographing on a sampled image on the display panel of the electronic device. For the camera, a CMOS/CCD camera with high resolution may be used, and the sampled image may be a color image or a gray level image. The electronic device may extract a gray level value of each pixel in the sampled image. When the sampled image is a color image, an actual gray level value corresponding to brightness of each pixel in the color image may be determined based on a correspondence between brightness and a gray level, to determine the gray level value (namely, the actual gray level value) of each pixel. When the sampled image is a gray level image, the gray level value of each pixel may be directly obtained.

The electronic device may obtain two second gray level values on the sampled image and corresponding second compensated gray level values. The second gray level value is a gray level value within the second gray level range. The electronic device may obtain a second compensated gray level value corresponding to each second gray level value by using a LUT, and the LUT may be a one-dimensional LUT, or may be a three-dimensional LUT. The electronic device may determine a second compensated gray level value corresponding to another gray level value within the second gray level range in the linear interpolation manner based on the two second gray level values and the second compensated gray level values corresponding to the two second gray level values.

For example, the camera may capture an image 4 of the sampled image in 8 gray levels, and an image 5 in 16 gray levels. The electronic device may obtain a second gray level value, recorded as G1, of a pixel point B in the 8 gray levels from the image 4, and obtain a second gray level value, recorded as G2, of the same pixel point B in the 16 gray levels from the image 5. The electronic device determines a first compensated gray level value G1' for G1, and a first compensated gray level value G2' for G2 through calculation. G1 and G1' are used as one piece of two-dimensional data, and G2 and G2' are used as one piece of two-dimensional data. For ease of understanding, reference may be made to FIG. 5. An abscissa of a coordinate system in FIG. 5 indicates a gray level, and an ordinate indicates a compensation gray level. In the coordinate system, coordinates of b1 are (G1, G1'), and coordinates of b2 are (G2, G2'). The electronic device determines a second compensated gray level value corresponding to another gray level value in the linear interpolation manner based on the point b1 and the point b2. A straight line $Y=dX+e$ is used as the second compensation gray level relationship, d is a coefficient of the linear equation, e is a constant term, and the electronic device stores the second compensation gray level relationship.

Optionally, the electronic device may obtain at least three second gray level values on the sampled image and corresponding second compensated gray level values. The electronic device may determine at least two linear straight lines between two second gray level values in the linear interpolation manner. That is to say; the second compensation gray level relationship may include at least two different linear straight lines, so that gray level compensation is performed on different gray level values for different line segments, to satisfy an irregular mura problem.

In some embodiments, the electronic device may divide a full gray level range into at least three gray level ranges in advance, for example, divide the full gray level range (namely, 0-255) into three gray level ranges, a first gray level range is 32-255, a second gray level range is 8-31, and a third gray level range is 0-7. There is a compensation gray level relationship matching each gray level range, for example, the first gray level range matches a first compensation gray level relationship, the second gray level range matches a second compensation gray level relationship, and the third gray level range matches a third compensation gray level relationship.

A process in which the electronic device determines a first compensation gray level matching 32-255 is not described again. A process in which the electronic device determines a second compensation gray level matching the gray level range of 8-31 is similar to a process in which the electronic device determines a second compensation gray level matching the gray level range of 0-31 are similar, and details are not described herein again.

In some embodiments, the third gray level range is 0-7, and when an OLED is within the gray level range of 0-7, because brightness is further reduced, TFT specificity further deteriorates, causing a display mura phenomenon of the OLED to be more serious. It is difficult for a CCD camera to capture brightness of an image within the gray level range of 0-7. In this example, the electronic device may fit an M-nomial curve by using a least squares method based on a plurality of second gray level values within the second gray level range and second compensated gray level values corresponding to the second gray level values, and M is an integer greater than 1. A process of determining the third compensation gray level relationship is similar to a process of determining the first compensation gray level relationship.

For example, the camera may capture an image 4 of the sampled image in 8 gray levels, an image 5 in 16 gray levels, and an image 6 in 31 gray levels. The electronic device may obtain a second gray level value, recorded as G1, of a pixel point B in the 8 gray levels from the image 4, obtain a second gray level value, recorded as G2, of the same pixel point B in the 16 gray levels from the image 5, and obtain a second gray level value, recorded as G3, of the same pixel point B in the 31 gray levels from the image 6. The electronic device determines a second compensated gray level value G1' for G1, a second compensated gray level value G2' for G2, and a second compensated gray level value G3' for G3 through calculation. G1 and G1', G2 and G2', and G3 and G3' each are used as one piece of two-dimensional data.

For ease of understanding, refer to FIG. 5. An abscissa of a coordinate system in FIG. 5 indicates a gray level, and an ordinate indicates a compensation gray level. In the coordinate system, coordinates of b1 are (G1, G1'), coordinates of b2 are (G2, G2'), and coordinates of b3 are (G3, G3'). Fitting is performed on a1, a2, and a3 based on the least squares method, to obtain $Y=a1X^2+b1X+c1$, where a1, b1 and c1 are coefficients of the quadratic equation curve, Y expresses a compensated gray level value, and X expresses a gray level value. The curve $Y=a1X^2+b1X+c1$, as the third compensation gray level relationship, is stored in the electronic device.

The electronic device prestores the compensation gray level relationship matching each gray level range, and the electronic device obtains the gray level value of each pixel in the input image. The electronic device performs the following compensation processing on the gray level value of each pixel.

The electronic device determines, based on the gray level value of the pixel and the at least three gray level ranges, a gray level range that the gray level value is within: determines a compensated gray level value of the gray level value based on the first compensation gray level relationship when detecting that the gray level value is within the first gray level range: determines a compensated gray level value of the gray level value based on the second compensation gray level relationship when detecting that the gray level value is within the second gray level range: determines a compensated gray level value of the gray level value based on the third compensation gray level relationship when detecting that the gray level value is within the third gray level range; and performs compensation on the gray level value of the pixel based on the determined compensated gray level value.

For example, the first gray level range is 32-255, the second gray level range is 8-31, and the third gray level range is 0-7. If a driver IC (namely, a display driver) of the display panel of the electronic device detects that a gray level of the pixel A is 2 and is within the third gray level range, the driver IC performs compensation on the gray level of the pixel A by using a third compensation gray level. The driver IC may perform gray level compensation on a gray level of each pixel in the input image, to obtain a compensated input image.

Step 303: Display a compensated image on the display panel of the electronic device.

For example, the driver IC of the display panel transmits the compensated image to the panel for display.

In this example, a full gray level is divided into a plurality of gray level ranges, and there is a compensation gray level relationship matching each gray level range. A type of mura occurring on the display panel within the first gray level range (for example, 32-255) is unitary, and a degree of mura on the display panel is gradually decreased as a gray level increases. Gray level compensation may be accurately performed on the display panel within the first gray level range by using a polynomial curve. However, when the gray level of the display panel is below 32, a TFT feature in the display panel deteriorates sharply, adding an extra mura type, making mura more serious, and showing an irregular change. The second compensation gray level relationship matching a second stage range is obtained in the linear interpolation manner, so that the obtained second compensation gray level relationship is more accurate for gray level compensation; and additionally, may also be decoupled from the compensation gray level relationship for the first gray level range. Brightness of the display panel within the third gray level range is lower, and the CCD camera cannot capture accurate brightness. Therefore, mura within a gray level interval of 0-7 is predicted by using a polynomial curve of 8-31 gray levels, gray level compensation is more accurately performed on a pixel, and a curve obtained in this manner also takes into account a trend of gray levels of 0-7, which may avoid a sudden jump at a gray level.

Figure 6:
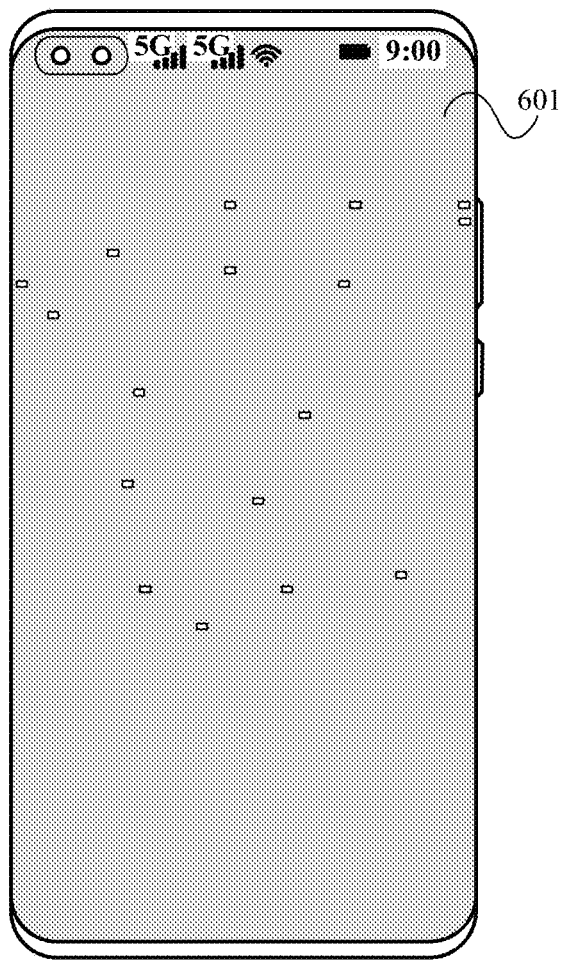
FIG. 6 is an exemplarily shown schematic diagram of an image displayed on a display panel.
Figure 6:
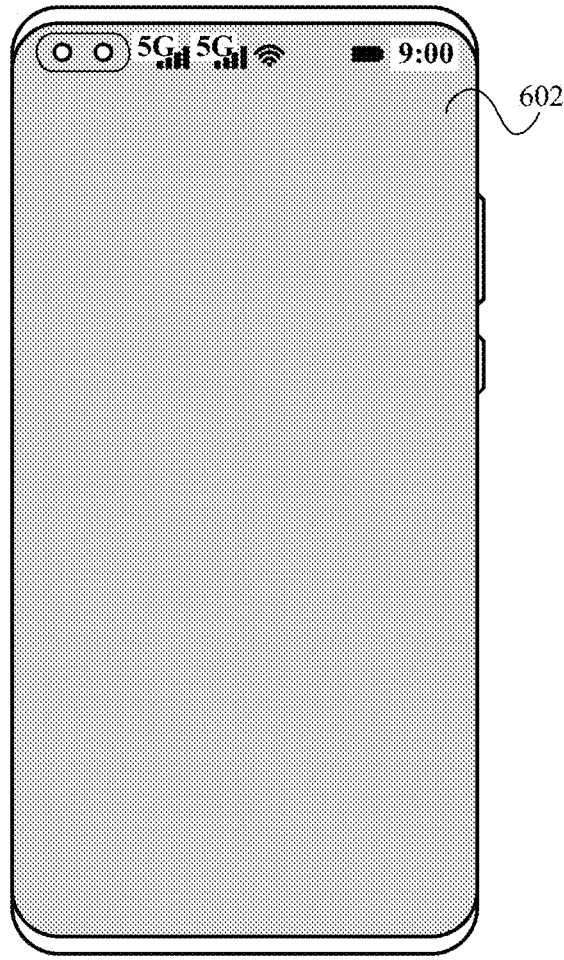

FIG. 6 is an exemplarily shown schematic diagram of an image displayed on a display panel. As shown in 6a in FIG. 6, because there is a display mura problem in an OLED, gray levels of some pixels in an image A displayed in a display interface 601 are high. In this example, before the gray level image A is displayed, a first compensation gray level relationship matching a first gray level range, a second compensation gray level relationship matching a second gray level range, and a third compensation gray level relationship matching a third gray level range are stored. A display driver of a display screen may obtain a gray level value of each pixel in the image A, determine a gray level range that the gray level value of each pixel is within, and perform gray level compensation on the pixel by using a compensation gray level relationship for the gray level range that the pixel is within, to obtain a compensated image. For example, if a gray level value of a pixel 1 is within the first gray level range, compensation is determined to be performed on the gray level value of the pixel 1 based on the first compensation gray level relationship. If a gray level value of a pixel 2 is within the second gray level range, compensation is determined to be performed on the gray level value of the pixel 2 based on the second compensation gray level relationship. If a gray level value of a pixel 3 is within the third gray level range, compensation is determined to be performed on the gray level value of the pixel 3 based on the third compensation gray level relationship. When an operation of gray level compensation is completed for each pixel, a compensated image A may be obtained. The display driver indicates to display the compensated image A on the display screen. As shown in 6b in FIG. 6, a display mura problem of the compensated image displayed on the display interface 602 has been eliminated.

It may be understood that to implement the foregoing functions, the electronic device comprises corresponding hardware and/or software modules for performing the functions. Algorithm steps in the examples described with reference to the embodiments disclosed in this specification can be implemented by hardware or a combination of hardware and computer software in this application. Whether a function is performed by hardware or computer software driving hardware depends on particular applications and design constraints of the technical solutions. A person of skill in the art may use different methods to implement the described functions with reference to embodiments for each particular application, but it should not be considered that the implementation goes beyond the scope of this application.

This embodiment further provides a computer storage medium. The computer storage medium stores computer instructions. The computer instructions, when run on an electronic device, cause the electronic device to perform steps of the above relevant methods to implement the methods run by the applications in the above embodiments. The storage medium includes: any medium that can store program code, such as a USB flash drive, a removable hard disk, a read-only memory (read only memory, ROM), a random access memory (random access memory, RAM), a magnetic disk, or a compact disc.

This embodiment further provides a computer program product. The computer program product, when run on a computer, cause the computer to perform the foregoing related steps, to implement the methods run by the applications in the foregoing embodiments.

The electronic device, the computer storage medium, the computer program product, or the chip provided in the embodiments may be configured to perform the corresponding method provided above. Therefore, for beneficial effects that can be achieved, refer to the beneficial effects of the corresponding method provided above. Details are not described herein again.

The term "and/or" used in this specification describes only an association relationship for describing associated objects and represents that three relationships may exist. For example, A and/or B may represent the following three cases: Only A exists, both A and B exist, and only B exists.

In the specification and claims in the embodiments of this application, the terms "first", "second", and the like are intended to distinguish between different objects but do not indicate a particular order of the objects. For example, a first target object, a second target object, and the like are intended to distinguish between different target objects but do not indicate a particular order of the target objects.

In the embodiments of this application, the word such as "exemplary" or "for example" is used to represent giving an example, an illustration, or description. Any embodiment or design scheme described as an "exemplary" or "for example" in the embodiments of this application should not be explained as being more preferred or having more advantages than another embodiment or design scheme. In particular, use of the word such as "exemplary" or "example" is intended to present a related concept in a specific manner.

In the description of the embodiments of this application, unless otherwise stated, "a plurality of" means two or more. For example, a plurality of processing units are two or more processing units; and a plurality of systems are two or more systems.

Any content of each embodiment of this application and any content of a same embodiment can be freely combined. Any combination of the foregoing content is within the scope of this application.

Although the embodiments of this application have been described above with reference to the accompanying drawings, this application is not limited to the foregoing specific implementations, and the foregoing specific implementations are merely exemplary and not limitative. A person of ordinary skill in the art may make various variations under the enlightenment of this application without departing from the spirit of this application and the protection scope of the claims, and such variations shall all fall within the protection scope of this application.

What is claimed is:

1. A method, comprising:
obtaining a gray level value of each pixel of an input image;
performing gray level compensation on the input image based on the gray level value of each pixel and at least two compensation gray level relationships, wherein a first compensation gray level relationship matches a first gray level range, and a second compensation gray level relationship matches a second gray level range, wherein the first compensation gray level relationship is fitted and generated based on an N-nomial algorithm, N is an integer greater than 1, and the second compensation gray level relationship is obtained in a linear interpolation manner, and wherein a gray level value within the first gray level range is greater than a gray level value within the second gray level range; and
displaying a compensated image on a display panel of an electronic device, wherein the compensated image is based on the gray level compensation of the input image.

2. The method of claim 1, further comprising:
obtaining at least three first gray level values of a sampled image displayed on the display panel, wherein the first gray level value is within the first gray level range;
obtaining first compensated gray level values for the at least three first gray level values; and
fitting and generating an N-nomial curve as the first compensation gray level relationship based on the at least three first gray level values, the first compensated gray level values that correspond to the first gray level values, and the N-nomial algorithm.

3. The method of claim 1, further comprising:
acquiring at least two second gray level values of a sampled image displayed on the display panel, wherein the second gray level value is within the second gray level range; and
obtaining second compensated gray level values respectively corresponding to the at least two second gray level values,
wherein the second compensation gray level relationship is at least one linear straight line derived in the linear interpolation manner based on the at least two second gray level values and the second compensated gray level values respectively corresponding to the at least two second gray level values.

4. The method of claim 3, wherein the second compensation gray level relationship is capable of comprising the at least one linear straight line.

5. The method of claim 1, wherein a third compensation gray level relationship matches a third gray level range, the third compensation gray level relationship is fitted and generated based on a gray level value within the second gray level range and an M-nomial algorithm, M is an integer greater than 1, and each gray level value within the second gray level range is greater than a gray level value within the third gray level range.

6. The method of claim 5, further comprising:
acquiring at least three second gray level values of a sampled image displayed on the display panel, wherein the second gray level value is within the second gray level range;
obtaining second compensated gray level values for the at least three second gray level values; and
fitting and generating an M-nomial curve as the third compensation gray level relationship based on the at least three second gray level values, the second compensated gray level values that correspond to the second gray level values, and the M-nomial algorithm.

7. The method of claim 5, wherein a compensated gray level value of the gray level value of a pixel is based on the first compensation gray level relationship when the gray level value of the pixel is within the first gray level range, wherein the compensated gray level value of the gray level value of a pixel is based on the second compensation gray level relationship when the gray level value of the pixel is within the second gray level range, wherein the compensated gray level value of the gray level value of a pixel is based on the third compensation gray level relationship when the gray level value of the pixel is within the third gray level range, and wherein performing gray level compensation on the input image based on the gray level value of each pixel and the at least two compensation gray level relationships comprises performing compensation on the gray level value of the pixel based on the compensated gray level value for the pixel.

8. The method of claim 1, wherein the first gray level range comprises: 32-255, and the second gray level range comprises: 0-31.

9. The method of claim 5, wherein the first gray level range comprises: 32-255, the second gray level range comprises: 8-31, and the third gray level range comprises: 0-7.

10. The method of claim 3, wherein obtaining second compensated gray level values respectively corresponding to the at least two second gray level values comprises querying the second compensated gray level values corresponding to the at least two second gray level values based on a preset lookup table (LUT).

11. An electronic device, comprising:
one or more processors;
a display panel coupled to the one or more processors; and
a memory coupled to the one or more processors, wherein the memory is configured to store instructions that, when executed by the one or more processors, cause the electronic device to be configured to:
obtain a gray level value of each pixel of an input image;
perform gray level compensation on the input image based on the gray level value of each pixel and at least two compensation gray level relationships, wherein a first compensation gray level relationship matches a first gray level range, and a second compensation gray level relationship matches a second gray level range, wherein the first compensation gray level relationship is fitted and generated based on an N-nomial algorithm, N is an integer greater than 1, and the second compensation gray level relationship is obtained in a linear interpolation manner, and wherein a gray level value within the first gray level range is greater than a gray level value within the second gray level range; and
display a compensated image on the display panel, wherein the compensated image is based on the gray level compensation of the input image.

12. A non-transitory computer-readable storage medium, comprising instructions that, when executed by one or more processors of an electronic device, cause the electronic device to be configured to:
obtain a gray level value of each pixel of an input image;
perform gray level compensation on the input image based on the gray level value of each pixel and at least two compensation gray level relationships, wherein a first compensation gray level relationship matches a first gray level range, and a second compensation gray level relationship matches a second gray level range, wherein the first compensation gray level relationship is fitted and generated based on an N-nomial algorithm, N is an integer greater than 1, and the second compensation gray level relationship is obtained in a linear interpolation manner, and wherein a gray level value within the first gray level range is greater than a gray level value within the second gray level range; and
display a compensated image on a display panel of the electronic device, wherein the compensated image is based on the gray level compensation of the input image.

13. The electronic device of claim 11, wherein the instructions, when executed by the one or more processors, further cause the electronic device to be configured to:
obtain at least three first gray level values of a sampled image displayed on the display panel, wherein the first gray level value is within the first gray level range;
obtain first compensated gray level values for the at least three first gray level values; and
fit and generate an N-nomial curve as the first compensation gray level relationship based on the at least three first gray level values, the first compensated gray level values that correspond to the first gray level values, and the N-nomial algorithm.

14. The electronic device of claim 11, wherein the instructions, when executed by the one or more processors, further cause the electronic device to be configured to:
acquire at least two second gray level values of a sampled image displayed on the display panel, wherein the second gray level value is within the second gray level range; and
obtain second compensated gray level values respectively corresponding to the at least two second gray level values,
wherein the second compensation gray level relationship is at least one linear straight line derived in the linear interpolation manner based on the at least two second gray level values and the second compensated gray level values respectively corresponding to the at least two second gray level values.

15. The electronic device of claim 14, wherein obtaining second compensated gray level values respectively corresponding to the at least two second gray level values comprises querying the second compensated gray level values corresponding to the at least two second gray level values based on a preset lookup table (LUT).

16. The electronic device of claim 11, wherein a third compensation gray level relationship matches a third gray level range, the third compensation gray level relationship is fitted and generated based on a gray level value within the second gray level range and an M-nomial algorithm, M is an integer greater than 1, and each gray level value within the second gray level range is greater than a gray level value within the third gray level range.

17. The electronic device of claim 16, wherein the instructions, when executed by the one or more processors, further cause the electronic device to be configured to:
acquire at least three second gray level values of a sampled image displayed on the display panel, wherein the second gray level value is within the second gray level range;
obtain second compensated gray level values for the at least three second gray level values; and
fit and generate an M-nomial curve as the third compensation gray level relationship based on the at least three second gray level values, the second compensated gray level values that correspond to the second gray level values, and the M-nomial algorithm.

18. The electronic device of claim 16, wherein a compensated gray level value of the gray level value of a pixel is based on the first compensation gray level relationship when the gray level value of the pixel is within the first gray level range, wherein the compensated gray level value of the gray level value of a pixel is based on the second compensation gray level relationship when the gray level value of the pixel is within the second gray level range, wherein the compensated gray level value of the gray level value of a pixel is based on the third compensation gray level relationship when the gray level value of the pixel is within the third gray level range, and wherein performing gray level compensation on the input image based on the gray level value of each pixel and the at least two compensation gray level relationships comprises performing compensation on the gray level value of the pixel based on the compensated gray level value for the pixel.

19. The electronic device of claim 16, wherein the first gray level range comprises: 32-255, the second gray level range comprises: 8-31, and the third gray level range comprises: 0-7.

20. The electronic device of claim 11, wherein the first gray level range comprises: 32-255, and the second gray level range comprises: 0-31.

* * * * *